June 9, 1953

S. E. OSTER 2,641,079

AUDIBLE SIGNAL AND DETACHABLE SECURING
MEANS FOR FISHING RODS

Filed June 9, 1949

INVENTOR.
Stanley Edward Oster
BY Robb & Robb
Attorneys.

Patented June 9, 1953

2,641,079

UNITED STATES PATENT OFFICE 2,641,079

AUDIBLE SIGNAL AND DETACHABLE SECURING MEANS FOR FISHING RODS

Stanley Edward Oster, Cleveland, Ohio

Application June 9, 1949, Serial No. 98,046

1 Claim. (Cl. 43—17)

My present invention comprises an audible signal and detachable securing means for securing the same to fishing rods.

When fishing with a rod or pole to which a line is attached, it is desirable to provide an audible signal means associated therewith to signal to the fisherman whenever he has a bite or strike so that the fisherman will be alerted to the necessity for exercising his skill in hooking the fish.

For thus purpose it has been common practice heretofore to provide an audible signal in the form of a bell or the like attached to the fishing rod or pole and adapted to be actuated to give an audible signal by vibration of the rod or pole caused by a fish striking the baited hook end of the line attached to such rod or pole.

Under certain conditions it may not be desired to utilize the audible signal, or it may be desired to transfer the audible signal to another fishing rod or pole, or for any one of various reasons it is desirable to be able to detach the audible signal of a fishing rod and quickly attach the same thereto.

It is therefore a principal object of my invention to supply such an audible signal which is capable of quick attachment to and quick detachability from a fishing rod or pole at any point intermediate the ends of the latter, without interference from or disturbance of the line guides which are usually associated with the fishing rod for guiding the fish line along the length of the pole or rod.

In carrying out my invention I have provided a very simple construction of audible signal and means for securing the same to a fishing rod, which may be quickly snapped onto the latter at any point intermediate its ends in a very simple and efficient manner and as quickly detachably removed from the fishing rod in a similar manner, without any necessity for using screw clamp parts or other similar expedients requiring the use of tools and more time for the attaching or detaching operation. Furthermore, the device of my invention does not have to be put on from one end of the pole or rod and therefore is not limited as to the position of its attachment upon the rod and is not interfered with in the attaching operation by the mounting of line guides on the pole or rod, nor does the mounting of my device on the rod require the preliminary removal of the line guide in order to position the audible signal device at the desired position. Thus my invention eliminates the various disadvantages above mentioned, which are appurtenant to devices heretofore employed for this purpose.

In carrying my invention into practice, I provide a hanger member to which the audible signal instrumentality is secured and which hanger member is formed of a single piece of spring wire having a helix portion at one end thereof, a tail hook portion at the other end thereof, and a body portion intermediate the other named portions. The helix portion is constructed to coil partially around the fishing rod, and has parts spaced axially along the axis of said helix portion, between which parts a portion of the fishing rod, intermediate the ends thereof, may be inserted for disposing the helix portion in coiled relation around the rod. The intermediate body portion is movable under spring action relative to the helix portion, and the tail hook portion is constructed and arranged to receive a portion of the rod under spring action of the intermediate body portion when the helix portion is disposed in coiled relation around the rod and the intermediate body portion is moved under spring action relative to said helix portion, this spring action of the body portion causing the helix portion to grippingly engage the rod to secure the hanger thereto against displacement relative to the rod.

In order to produce the spring action of the intermediate portion of the hanger when the hook portion is hooked on the rod, and the helix portion is coiled around the same, the helix portion of the hanger member is coiled about an axis in the plane of the body portion and tail hook portion but diverging away from said portions. In other words, when the fishing rod is inserted between the spaced parts of the helix portion and sprung into coiled relation around the rod, the intermediate body portion and tail hook portion stand away from the rod and the said body portion and tail hook portion may be moved relative to the helix portion under spring action so as to hook the tail hook portion in engagement with the rod, which action causes the helix portion to grippingly engage the rod to prevent displacement of the hanger therefrom.

The body portion of the spring wire hanger member is formed with a constricting loop portion which engages the audible signal member to secure the same thereto.

For a detail description of the invention, reference is made to the accompanying drawing, in which.

Figure 3:
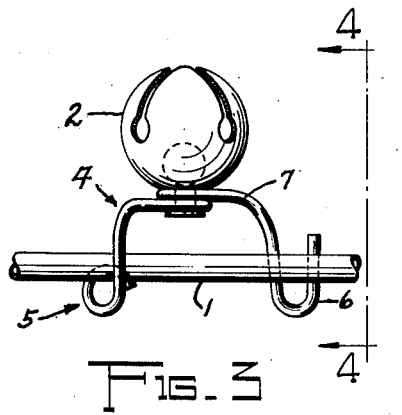
Figure 4:
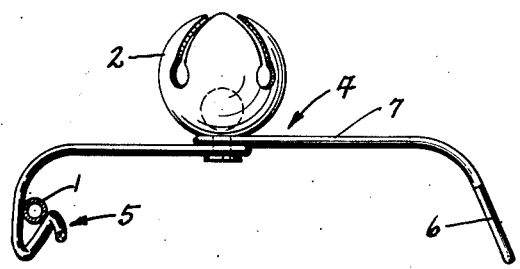

Figures 3 and 4 are views illustrating the manner in which the audible signal and securing means of my invention is attached to the fishing rod, said Figures 3 and 4 showing the fishing rod just as it is being inserted between the spaced parts of the helix portion, the fishing rod extending in a position transverse or crosswise of the axis of the helix portion for this operation, Figure 3 being a side elevation of the rod and showing the audible signal and securing means in the position assumed for the start of the attaching operation, and Figure 4 being a view taken on the line 4—4 of Figure 3, showing the fishing rod in section.

Now describing the invention in detail, the numeral 1 in the drawings designates a fishing rod, the numeral 2 designates an audible signal instrumentality consisting of a metal shell of generally spherical shape and containing therein loosely encompassed thereby a metallic ball member 3 of relatively small diameter which is designed to rattle around the metal shell 2 and thus give off an audible signal when the instrumentality 2 is vibrated.

Figure 1:
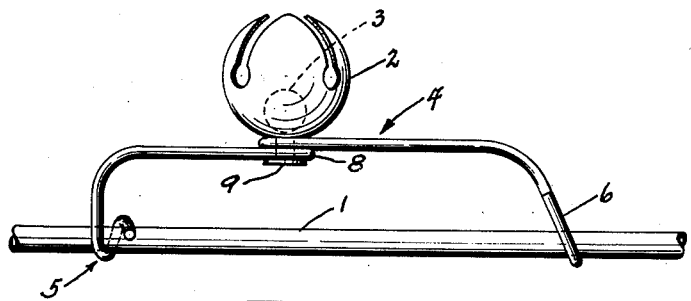
Figure 1 is a side elevation of a fragmentary portion of a fishing rod showing the audible signal and securing means of my invention mounted thereon.
Figure 2:
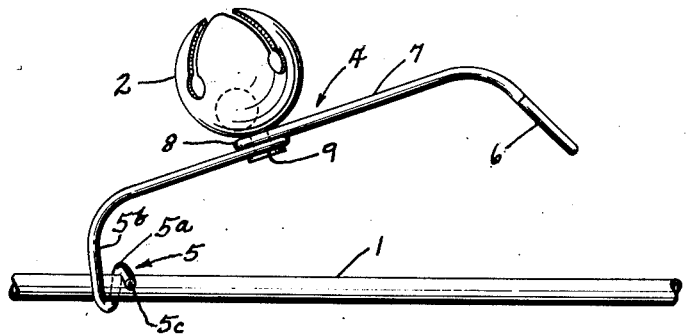
Figure 2 is a view similar to Figure 1, but showing the device as normally disposed when the helix portion is coiled around the fishing rod and the hook portion of the hanger is disengaged from the rod.

The securing means for securing the audible signal instrumentality 2 to the rod 1 consists of a hanger member generally designated by the numeral 4 and which is formed of a single piece of spring wire formed at one end with a helix portion 5, the said hanger member 4 being formed at the other end with a tail hook portion 6. The helix portion 5 of the hanger member 4 is constructed to coil partially about the rod 1, as shown in Figures 1 and 2, and the helix portion 5 has axially spaced parts 5a and 5b spaced axially along the axis of the helix portion a distance slightly less than the diameter of the fishing rod 1 which the helix portion 5 is adapted to coil around. The spacing of the parts 5a and 5b of the helix portion is such that the rod 1 may be inserted therebetween when the rod 1 is disposed transversely of the axis of the helix portion 5 as shown in Figures 3 and 4, but the spacing of the parts 5a and 5b is such that in inserting the rod 1 therebetween crosswise of the axis of the helix portion, the parts 5a and 5b will be sprung apart by engagement of the rod 1 therewith in forcing the entrance of the rod 1 between said parts 5a and 5b so that the rod 1 snaps between the portions 5a and 5b until it is seated in the bottom coil of the helix portion as shown in Figures 1 and 2.

In the operation of inserting the rod 1 between the spaced portions 5a and 5b, when the rod 1 has snapped between the same and is disposed against the bottom of the coil of the helix portion, the entire device is then turned relatively to the rod 1 to the position of Figure 2 to cause the end 5c of the helix portion to engage in coiled relation around the rod 1.

Now with the device disposed in the position of Figure 2, with the helix portion 5 coiled around said rod, the body portion 7 between the portions 5 and 6 of the hanger member 4, and the hook portion 6, stand off from the rod 1 in the manner indicated in Figure 2. The intermediate body portion 7, is, however, yieldably movable under spring action relative to the helix portion 5, in this condition, so that the intermediate body portion 7 and tail hook portion 6 of the hanger member 4 may, under the condition of Figure 2, be moved under spring action relative to the helix portion 5 to cause the tail hook portion 6 of the hanger 4 to be hooked around the fishing rod 1 in the manner illustrated in Figure 1, the hook portion 6 being formed as seen in Figure 3 to receive within said hook portion the rod 1 in the manner shown by Figure 1.

The intermediate body portion 7 of the hanger member 4 is formed with a constricting loop portion 8 which receives the shank of a rivet 9 secured to the signal instrumentality 2 so that the constricting loop portion 8 engages the shank of the rivet 9 between the shell of the signal member 2 and the head of said rivet 9 for securing the bell or audible signal member 2 to the hanger member 4.

The helix portion 5 of the hanger member 4 is coiled about an axis which, for the purpose of illustration, may be considered to be the axis of the rod 1 in Figure 2, the said axis of the helix portion 5 being in the plane of the intermediate body portion 7 and the tail hook portion 6 but diverging away from said portion. In other words, as illustrated in Figure 2, the helix portion 5 is coiled about an axis, represented by the axis of the fishing rod 1, which is in the plane of the paper of the drawing, and likewise the intermediate body portion 7 and the tail hook portion 6 are in the same plane of the paper; however, the said axis of the helix portion 5 represented by the axis of the rod 1, diverges away from the intermediate body portion 7 and the tail hook portion 6, as clearly understood from Figure 2, and speaking of the normal condition of the hanger member 4 when the tail hook portion 6 is not hooked in engagement with the fishing rod 1.

With this construction of the hanger member 4 as above described, and with the hook portion 6 formed to have its open entrance portion spaced inwardly toward the body portion 7, the said body portion 7 and hook portion 6, when the hanger member is in the condition of Figure 2, may be sprung or moved under spring action relative to the helix portion 5 to cause the hook portion 6 to be engaged with the rod 1 after the manner shown in Figure 1. This action of hooking the hook portion 6 into engagement with the rod 1 increases the spring tension on the helix portion 5 to cause the latter to more tightly grippingly engage the rod 1 so that with the hanger member disposed in the condition of Figure 1, the same is secured to the rod 1 against displacement relative thereto either axially or otherwise until such time as the body portion 7 is sprung toward the rod 1 to disengage the hook portion 6 therefrom, whereupon release of pressure on the body portion will enable the hanger member to spring back to the position of Figure 2, whereafter the signal device may be disassociated with the rod 1 by twisting the hanger member to dispose the same in the condition in which the rod extends crosswise or transverse of the axis of the helix portion 5. Then the rod 1 may be snapped upwardly between the axially spaced portion 5a and 5b of the helix portion 5 to disengage the rod from the hanger member.

It will be seen from the foregoing that my invention provides a very simple construction of audible signal and securing means therefor whereby the same may be quickly attached to and detached from the fishing rod 1 by a unique construction providing a snap action and spring tension when fully attached, which serves to prevent axial or other displacement of the signal device relative to the fishing rod. It will also be readily understood that the device of my invention can be attached to any portion of the fishing rod intermediate the ends thereof without need for mounting of the device from one end of the rod and without need of axial movement of the device axially of the rod to place it in the desired position so that the device may be attached to the rod without interference by or disturbance of the line guides which are normally associated with the fishing rod.

Having thus described my invention, what I claim as new and desire to secure by Letters Patent of the United States, is:

A signal device for a fishing rod, comprising, in combination, a hanger member consisting of a single piece of spring wire formed with a helix portion at one end thereof, a tail hook portion at the other end thereof, and a body portion intermediate said other named portions, said helix portion being constructed to coil partially around said rod and having parts spaced axially along the axis of said helix portion a distance less than the diameter of said rod, between which parts a portion of the rod, intermediate the ends thereof, may be inserted by snap action of said parts for disposing the helix portion in coiled relation around said rod, the intermediate body portion being movable under spring action relative to said helix portion, the tail hook portion being constructed and arranged to receive a portion of the rod under spring action of the intermediate body portion when the helix portion is disposed in said coiled relation around said rod and the intermediate body portion is moved under spring action relative to said helix portion, said spring action of said body portion causing the helix portion to grippingly engage the rod to secure the hanger thereto against displacement relative to the rod, said body portion being formed with a constricting loop portion integral with said body portion and intermediate the helix portion and tail hook portion, a vibration actuated audible signal instrumentality, and a connector member on the latter engaged by the constricting loop portion encircling said connector member for securing the instrumentality to the hanger member.

STANLEY EDWARD OSTER.

References Cited in the file of this patent

UNITED STATES PATENTS

| Number | Name | Date |
|---|---|---|
| 528,560 | Pendleton | Nov. 6, 1894 |
| 935,877 | Woesley et al. | Oct. 5, 1909 |
| 950,043 | Gierding | Feb. 22, 1910 |
| 950,148 | Dissel | Feb. 22, 1910 |
| 965,599 | Ramsburg | July 26, 1910 |
| 1,007,755 | Turgeon | Nov. 7, 1911 |
| 1,014,861 | Bennett | Jan. 16, 1912 |
| 1,875,697 | Blackburn | Sept. 6, 1932 |
| 2,319,462 | Kruse | May 18, 1943 |
| 2,561,675 | Ross | July 24, 1951 |